Aug. 20, 1963     O. SCHERZER ETAL     3,101,430
COMPENSATING LENS
Filed Aug. 16, 1960                     2 Sheets-Sheet 1
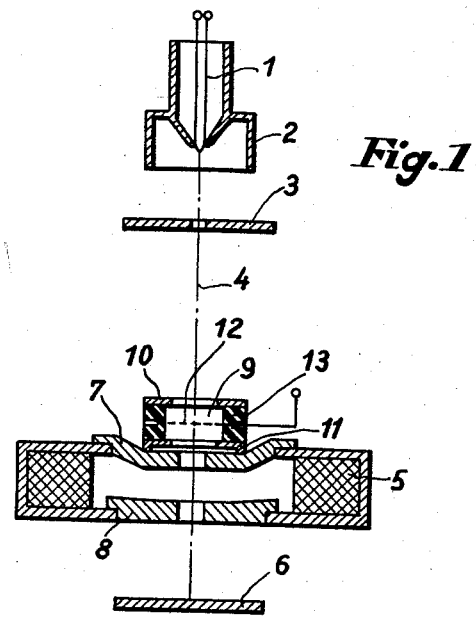
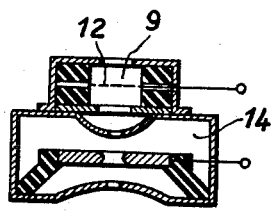
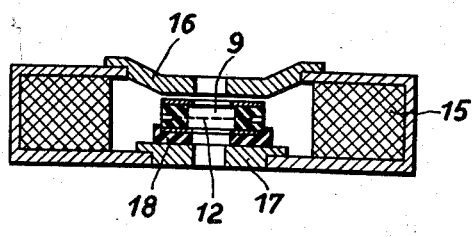
OTTO SCHERZER
KARL HEINZ STEIGERWALD
BY Emery Whittemore Sandoe & Graham Aug. 20, 1963    O. SCHERZER ETAL    3,101,430
COMPENSATING LENS
Filed Aug. 16, 1960    2 Sheets-Sheet 2

OTTO SCHERZER
KARL HEINZ STEIGERWALD

BY Emery Whittemore Sandoe & Graham

United States Patent Office 3,101,430
Patented Aug. 20, 1963

3,101,430
COMPENSATING LENS
Otto Scherzer, Darmstadt-Eberstadt, and Karl Heinz Steigerwald, Heidenheim an der Brenz, Wurttemberg, Germany, assignors to Carl Zeiss, Heidenheim an der Brenz, Wurttemberg, Germany
Filed Aug. 16, 1960, Ser. No. 49,981
Claims priority, application Germany Aug. 22, 1959
8 Claims. (Cl. 315—31)

The present invention relates to a device for compensating for the apertural defect of a space-charge-free electron optical lens of rotational symmetry.

In many devices which operate with a beam of charge carriers, such as oscilloscopes, television pickup tubes or video amplifiers, and industrial charge-carrier-beam apparatus for drilling, milling, heat treating, welding, soldering, surface treating or hardening of material, it is desired to concentrate the beam of charge carriers in the form of a spot which is as small and as high in intensity as possible. In such applications, there is generally used for the focusing of the beam an electron optical lens which is free of space charge and is of rotational symmetry. However, ideal focusing is prevented by the lens defects and, particularly, by the apertural defects of third and fifth order.

The apertural defect of an electron optical lens, as is known to the art, results from the fact that the outer lens areas have a greater power of refraction than the central area of the lens. Compensation for the apertural defect of an electrostatic lens by arranging electrostatic correcting elements behind the lens is known to the art. However, such compensation does away with the rotational symmetry of the lens. As such a correction element corrects the apertural defect of the lens only in a sectional plane, as a rule several correction elements are required. Such elements must be very carefully constructed and adjusted, making this type of compensation of apertural defects very expensive. Furthermore, it has the disadvantage that the correction of a beam of charge carriers of large diameter is possible only with great difficulty.

It is therefore, the primary object of this invention to provide improved apparatus for the compensation of the apertural defects of an electron optical lens of rotational symmetry. In accordance with this object there is provided, in accordance with a preferred embodiment of this invention, in or in the vicinity of said lens a correction element or lens which eliminates the freedom from charge of the inside of the lens and has a power of refraction which decreases with an increase in radius.

The correction element is developed as a netting lens which consists of a netting clamped between two ring electrodes arranged at right angles to the direction of the beam and is insulated from them. Instead of the netting there can also be provided a thin sheet containing holes of definite size. Similarly it is possible to have the sheet of different thickness at different points or to make the diameter of the holes dependent on the distance from the axis. Furthermore, it is often advantageous to arch the netting or the sheet.

In order to provide better control of the field produced by the corrective lens it is advisable to arrange on one or both sides of the netting or foil two ring electrodes which lie at different potentials and are insulated from each other.

The netting lens generates a corrective field having rotational symmetry. Thus, the compensation of the apertural defect of the electron optical lens can take place in one stage. Another advantage of the netting lens is that it is possible directly to correct a charge carrier beam of large diameter.

The disturbing action of the netting webs of the netting lens can be so limited by a favorable selection of the dimensions of the netting that the gain in intensity obtained more than counteracts this disturbing effect. The same applies to the lens action of the individual netting meshes and the defects of the individual lenses. Since there is concerned here the problem of bringing together a beam passing through a large number of surface elements at a single surface element, a limited defect of all elements can be permitted. Also, these defects are less serious in applications concerned primarily with reduction of beam size, in contradistinction to such applications as electron microscopy.

The charge induced on the netting and, thus, the lens action of the individual meshes of the netting may be maintained small if the electrode shapes and the voltages are selected so that the field intensities on both sides of the netting differ only little in magnitude and direction from each other.

In order to obtain a compact construction, it is advisable to combine the electron optical lens and the netting lens into a single structural unit. This combination of elements is particularly possible to correction of the focusing of a beam of charge carriers of small aperture, since the correcting action of the netting lens is fully effective even if this netting lens is not arranged in the principal plane of the electron optical lens. Therefore in such applications it is readily possible to place the netting lens on the electrode of the electron optical lens which faces the beam generating system (e.g. the electron gun). Furthermore, it is possible to arrange the netting lens below or within the electron optical lens.

This invention will be more clearly understood by reference to the following description taken in combination with the accompanying drawings, of which:

FIG. 1 is a partially sectioned view of a schematic showing of a charge carrier beam apparatus provided with an electromagnetic focusing lens with associated netting lens in accordance with the present invention;

FIG. 2 is a cross-section through an electrostatic focusing lens combined with a netting lens to form a single structural unit;

FIG. 3 is a section through an electromagnetic focusing lens combined with a netting lens to form a single structural unit;

Figure 4:
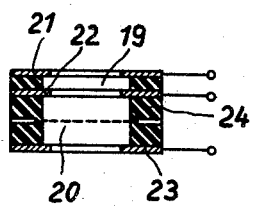
FIG. 4 is a section through a netting lens having a plurality of ring electrodes.

In FIG. 1, there is shown a charge carrier beam generating system comprising a cathode 1, a modulator electrode 2, and an anode 3. The beam generating system consisting of these three elements produces an electron beam 4 which by means of an electromagnetic lens 5 is focused on the structural element 6. The structural element 6 can be the fluorescent screen of an oscilloscope, the semiconductor coating of a television pickup tube, the target electrode of a video amplifier or, in the case of industrial electron beam apparatus, the object which is to be processed.

The pole shoes of the electromagnetic lens 5 are marked 7 and 8. On the upper pole shoe 7, there is placed a netting lens 9 which consists of a conductive netting or screen 12 clamped between the ring electrodes 10 and 11 which are arranged at right angles to the direction of the beam. This netting is insulated by the insulator 13 from the ring electrodes 10 and 11.

In operation, a negative voltage is applied to the netting 12 while the ring electrodes 10 and 11 are grounded. As a result of this, there is produced on the netting a surface charge which has the result that the negative power of refratcion of the netting lens 9 increases in amount with an increase in radius, i.e. that the effective power of refraction decreases as a function of the radius. Since this decrease in the power of refraction takes place with the third power of the radius, it is possible with this netting lens fully to compensate for the apertural defect of third order of the lens 5.

FIG. 2 shows an electrostatic lens 14 of known construction which is combined with the netting lens 9 to form a single structural unit. The combined lenses shown here can serve predominantly for the correction of a beam of charge carriers of small aperture, since in general the principal plane of the lens 14 will not coincide with the plane of the netting 12. If a beam of charge carriers of large aperture is to be corrected, it is necessary to arrange the netting lens 9 in or in the immediate vicinity of the principal plane of the lens 14.

FIG. 3 shows an electromagnetic lens between the pole shoes 16 and 17 of which the netting lens 9 is arranged. Insulator 18 supports the netting lens. The lens combination shown in FIG. 3 is particularly useful for correcting a beam of charge carriers of large aperture since the principal plane of the lens 15 coincides here with the plane of the netting 12.

FIG. 4 shows a netting lens 19 in which two ring electrodes 21 and 22 are arranged in front of the netting 20. Behind the netting 20, there is arranged another ring electrode 23. An insulator 24 serves to insulate the individual electrodes from each other.

The netting lens shown here makes it possible better to control the charges induced in the netting than with a netting lens equipped with only two ring electrodes, such as shown for instance in FIGS. 1 to 3. In order to control the space charge, the ring electrodes 21 and 22 are placed under different voltage.

If, for example, the electrode 22 is biased slightly positive with respect to the netting, the voltage of the electrode 21 is strongly negative with respect to the netting, and the electrode 23 is maintained at the netting potential, a slightly positive charge will be induced in the center of the netting and a slightly negative charge in its outer zones. In between, there is a region which is practically free of charge. In this way, the correction is effected without the induced charges on the individual wires of the netting causing any noticeable field disturbance in the vicinity of the individual netting wires. Thus a disturbingly large lens effect of the individual netting meshes is prevented.

Figure 5:
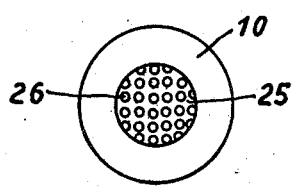
FIG. 5 is a plane view of a netting lens using a sheet perforated with holes of definite size.

In the case of the netting lenses shown in FIGS. 1 to 4, a foil with holes can be provided instead of the netting. Such a lens is shown in FIG. 5. The netting consists of a sheet 25 which is perforated by holes 26 of predetermined size. The lens itself is of the same construction as the netting lens 9 shown in FIG. 1. All the holes 26 in the sheet may have the same diameter. It is, however, also possible to provide holes the diameters of which vary with its distance from the axis. For example the diameter of the holes 33 near the axis may be greater than the diameter of the holes in the outer periphery of the sheet.

Figure 6:
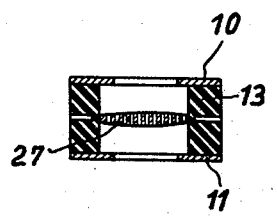
FIG. 6 is a section through a netting lens which, instead of a netting, contains a sheet of different thickness at different places.

FIG. 6 shows another netting lens in which instead of the netting there is provided a sheet 27 which is of different thickness at different points.

Figure 7:
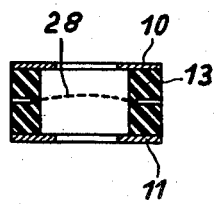
FIG. 7 is a section through a netting lens with arched netting.

In many cases, it may be advantageous instead of the netting lens 9 shown in FIG. 1 which contains a taut netting 12 to provide a netting lens of arched netting. Such a lens is shown in FIG. 7 which clearly shows the curvature of the netting 28. Of course, instead of the netting 28 an arched sheets with holes of definite size can also be provided.

Figure 8:
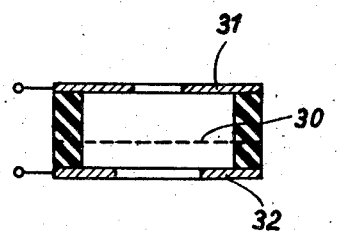
FIG. 8 is a section through another embodiment of a netting lens.
Figure 9:
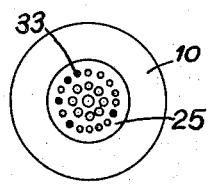
FIG. 9 is a plan view of a netting lens using a sheet perforated with holes of varying size.

FIG. 8 shows another embodiment of a netting lens with only two ring electrodes. In the case of this netting lens, it is seen to it by suitable dimensionings of the ring electrodes and by selection of the voltages applied to them that the total charge induced by the ring electrodes on the part of the netting traversed by the beam is small. The netting itself is designated 30 while the upper ring electrode bears the designation 31 and the lower ring electrode the designation 32. The electrode 31 is at negative potential and has a smaller opening serving for the passage of the beam than the lower electrode 32 which is at positive potential. The netting 30 is so arranged that its distance from the ring electrode 31 is greater than its instance from the ring electrode 32. In the center of the netting 30, the positive charge density induced by the upper ring electrode 31 predominates, while in the outer parts of the netting the negative charge induced by the lower electrode 32 predominates. Accordingly, in the center the netting produces a positive power of refraction which decreases towards the outside and even becomes negative further towards the outside. In the annular region in which the charge densities induced from both sides are equal and opposite to each other, there is no lens effect of the individual netting meshes.

By the apparatus described and shown, it is possible to produce a small charge-carrier beam spot of high intensity. In this way, it is possible to obtain a high surface intensity with small absolute diameters of the beam. The intensity over the cross-section of the beam should be so distributed that it drops rapidly at the edges. Such an intensity distribution is of particularly great importance when working material with beams of charge carriers, since here it is important to combine as much energy as possible within the limits of the place being machined.

This invention may be variously modified and embodied within the scope of the subsequent claims.

What is claimed is:

1. Apparatus for compensating for the apertural defect of an electron optical lens of rotational symmetry which is free of space charge, comprising a corrective lens, said corrective lens being positioned near the principal plane of said electron optical lens, said corrective lens comprising a first and second ring electrode positioned in parallel planes perpendicular to the axis of the beam, a netting clamped between said ring electrodes and insulated therefrom, and means for biasing each of said ring electrodes to induce a charge distribution on said netting varying with the distance from the center of the netting, the total charge so induced on the netting traversed by the beam being so slight that no disturbing lens effect of the individual netting meshes occurs.

2. Apparatus according to claim 1 which includes a third ring electrode positioned parallel to said first ring electrode and insulated therefrom and which includes means for biasing said third electrode.

3. Apparatus according to claim 2, in which said first and third ring electrodes are positioned in front of the netting, as seen in the direction of the beam, and in which said electrodes are biased so that said third electrode is negative with respect to the netting, said first electrode is positive with respect to the netting and is of lower absolute magnitude than said negative bias on said third electrode, and second ring electrode is at the netting potential.

4. Apparatus according to claim 1, in which the upper ring electrode as seen in the direction of the beam is biased at a negative potential relative to the netting and has a smaller aperture for the passage of the beam than the lower ring electrode, the lower ring electrode is biased at a positive potential with respect to the netting, and the distance of the netting from the upper ring electrode is greater than its distance from the lower ring electrode.

5. Apparatus according to claim 1, in which said netting is formed from a thin perforated foil.

6. Apparatus according to claim 5, in which the diameter of the holes contained in the foil varies with the distance of the holes from the axis.

7. Apparatus according to claim 1, in which the netting is arched.

8. Apparatus according to claim 5, in which the foil varies in thickness along a radius from the axis.

References Cited in the file of this patent

UNITED STATES PATENTS 2,486,856     Liebmann _____ Nov. 1, 1949